United States Patent [19]
Yoshino et al.

[11] Patent Number: 5,460,875
[45] Date of Patent: * Oct. 24, 1995

[54] HARD AUSTENITIC STAINLESS STEEL SCREW AND A METHOD FOR MANUFACTURING THE SAME

[75] Inventors: Akira Yoshino, Osakasayama; Masaaki Tahara, Takatsuki; Haruo Senbokuya, Tondabayashi; Kenzo Kitano, Kawachinagano; Teruo Minato, Hashimoto, all of Japan

[73] Assignee: Daidousanso Co., Ltd., Osaka, Japan

[ * ] Notice: The portion of the term of this patent subsequent to May 30, 2012 has been disclaimed.

[21] Appl. No.: 207,265

[22] Filed: Mar. 8, 1994

Related U.S. Application Data

[63] Continuation of Ser. No. 758,829, Sep. 12, 1991, abandoned, which is a continuation-in-part of Ser. No. 699,440, May 13, 1991, abandoned.

[30] Foreign Application Priority Data

Oct. 4, 1990 [JP] Japan ................................. 2-267729
Aug. 31, 1991 [JP] Japan ................................. 3-246790

[51] Int. Cl.$^6$ ..................................................... G23C 8/26
[52] U.S. Cl. ........................ 428/332; 428/217; 428/469; 428/472; 428/698; 411/411; 411/383
[58] Field of Search ................................. 428/698, 472, 428/469, 217, 332; 411/411, 383

[56] References Cited

U.S. PATENT DOCUMENTS

| | | | |
|---|---|---|---|
| 136,213 | 2/1873 | Cochrane | 148/14 |
| 1,660,960 | 2/1928 | Greenslade | 148/12.1 |
| 1,958,575 | 5/1934 | Hengstenberg | 148/16.6 |
| 2,263,527 | 11/1941 | Werme | 411/403 |
| 2,299,138 | 10/1942 | Gier, Jr. | 148/16.5 |
| 2,851,387 | 9/1958 | Low | 148/16.6 |
| 3,140,205 | 7/1964 | Malcolm | 148/16.6 |
| 3,344,817 | 10/1967 | Connard | 148/16.5 |
| 3,804,678 | 4/1974 | Kindleman | 148/16.6 |

(List continued on next page.)

FOREIGN PATENT DOCUMENTS

| | | |
|---|---|---|
| 0166847 | 1/1986 | European Pat. Off. . |
| 2155078 | 5/1973 | France . |
| 2404142 | 4/1979 | France . |
| 3235447 | 5/1983 | Germany . |
| 62-40320 | 3/1987 | Japan . |
| 62-40319 | 3/1987 | Japan . |
| 2006833 | 5/1979 | United Kingdom . |

OTHER PUBLICATIONS

Uggowitzer et al., Strengthening of Austenitic Stainless Steel by Nitrogen, High Nitrogen Steels, pp. 174–179, May 18–20, 1988, Lille, Fr. Soc. Inst. of Metallurgy Swiss Fed., Inst. of Technology, Zurich.

Patent Abstract of Japan, vol. 007, No. 181 (C–180) 10 Aug. 1983 of JP-A-58 084 968 (Daini Seikisha KK) 21 May 1983.

*Primary Examiner*—Archene Turner
*Attorney, Agent, or Firm*—Armstrong, Westerman, Hattori, McLeland & Naughton

[57] ABSTRACT

This invention allows to form a nitrided hard layer on the surface of an austenitic stainless steel screw by forming a nitrided layer thereon and to prevent causing rust on some parts such as a screw head portion which is in contact with the outside air by removing the nitrided hard layer to expose austenitic stainless steel base which has sufficient corrosion resistance. On the contrary, in a thread part and the like of the screw, the nitrided hard layer is left and to thereby improves hardness and the like to strengthen tapping functions and the like of the screw. In the method for manufacturing the austenitic stainless steel screw according to the invention, the austenitic stainless steel screw is held in a fluorine- or fluoride-containing gas atmosphere prior to nitriding to form a fluorided film on its surface and then is nitrided in that state. Accordingly, so formed nitrided hard layer becomes uniform and deep to obtain an austenitic stainless steel screw having excellent surface properties.

2 Claims, 2 Drawing Sheets

U.S. PATENT DOCUMENTS

| | | | |
|---|---|---|---|
| 3,943,010 | 3/1976 | Harline III | 148/16.6 |
| 4,011,111 | 3/1977 | Hook | 148/16.6 |
| 4,046,601 | 9/1977 | Hook | 148/318 |
| 4,062,701 | 12/1977 | Juhas | 148/16.5 |
| 4,154,629 | 5/1979 | Asai et al. | 148/16.6 |
| 4,184,899 | 1/1980 | Blas et al. | 148/16.6 |
| 4,242,151 | 12/1980 | Levegue | 148/16.6 |
| 4,264,380 | 4/1981 | Rose et al. | 148/16.6 |
| 4,268,323 | 5/1981 | Jakubowski et al. | 148/15.5 |
| 4,366,008 | 12/1982 | Takeuchi et al. | 148/12.4 |
| 4,464,207 | 8/1984 | Kindlemann | 148/16.6 |
| 4,717,300 | 1/1988 | Alvi et al. | 148/12.4 |
| 4,975,147 | 12/1990 | Tahara et al. | 156/646 |
| 5,013,371 | 5/1991 | Tahara et al. | 148/16.6 | ial
HARD AUSTENITIC STAINLESS STEEL SCREW AND A METHOD FOR MANUFACTURING THE SAME This application is a continuation of application Ser. No. 07/758,829 filed Sep. 12, 1991 now abandoned, which is a continuation-in-part of application Ser. No. 07/699,440, filed May 13, 1991 now abandoned.

TECHNICAL FIELD

This invention relates to a hard austenitic stainless steel screw which is excellent in corrosion resistance and a method for manufacturing the same.

PRIOR ART

Generally an austenitic stainless steel is higher in corrosion resistance against acid or salt compared with a carbon steel. However, in surface hardness and strength, it is inferior to the carbon steel. Therefore, it is not proper to use this stainless steel for a screw which particularly needs a function to tighten to an iron-based plate by self-tapping, such as a tapping screw, a self-drilling screw and a dry wall screw. For this purpose, plated carburized iron articles or 13 Cr stainless steel articles are used. It is pointed out as some drawbacks that these articles are not only inferior in oxidation resistance (rust resistance) to the austenitic stainless steel articles but also weak in their tightening function due to corrosion of their base material by acid rain which is one of the big environmental problems in these days. In this aspect, the austenitic stainless steel articles are far excellent in acid resistance. Accordingly, the inventors provided a new technology for maintaining tapping property as well as carburized iron articles by nitriding-hardening the austenitic stainless steel screw (Japanese Patent Application Nos. 177660/1989 and 267729/1990).

According to the technology, a nitrided hard layer by which even a thick iron plate is drilled and tapped self-forcedly can be formed on the whole surface of the austenitic stainless steel screw. However, the new technology holds a serious defect that so formed nitrided hard layer is lack of enough corrosion resistance characteristic of austenitic stainless steel. For example, in case of using an austenitic stainless steel screw having so formed nitrided hard layer, its screw head exposed to outside is easy to cause rust. Generally, when using (tightening) a screw, its head and neighborhood of the same are visible, being exposed to outside. An austenitic stainless steel screw as a commercial goods is devaluated by even a bit of change in color of its screw head due to rust. It is possible to conduct plating or color-painting to the surface of a nitrided hard layer after nitriding in order to prevent rust from generating there. However, this is only a temporary solution not a fundamental one. So as to protect the screw head or the like against nitriding, it was proposed to apply some methods, such as a copper-plating and a masking by flame coating, to said parts prior to nitriding. Even if these methods are conducted, it is difficult to completely prevent nitriding on the surface of the austenitic stainless steel base of said portion.

OBJECT OF THE INVENTION

Accordingly, it is the object of the invention to provide a hard austenitic stainless steel screw which has the same tapping property and the like as carburized iron articles and to improve corrosion resistance of visible parts thereof exposed to outside in use, such as a head part, to exclude generating rust and the like.

DISCLOSURE OF THE INVENTION

To accomplish the above-mentioned purpose, the invention provides a hard austenitic stainless steel screw, as a first gist, characterized in that a nitrided hard layer is formed on the surface of the austenitic stainless steel screw, and that the nitrided layer of predetermined parts of the nitrided screw is removed, and as a second gist, a method for manufacturing a hard austenitic stainless steel screw comprising steps of heating an austenitic stainless steel screw in a nitriding atmosphere to form a nitrided hard layer on the screw surface, and removing the nitrided hard layer of predetermined parts of the austenitic stainless steel screw partially.

During the process of accumulated research for preventing rust from generating on a head part and the like of an austenitic stainless steel screw, the inventors came to have an idea to remove a nitrided hard layer from the head part or the like and conducted a series of tests to prove it. As a result, they found out that even if the nitrided hard layer was removed from the head part or the like of said screw, tapping and drilling functions, which had been improved by nitriding, would never be deteriorated and, what was more, corrosion resistance would be improved. A nitrided hard layer of the austenitic stainless steel screw is required a thickness of 30 to 200 µm in general, preferably 40 to 80 µm for improving tapping and drilling functions. Sixty to seventy percents in whole thickness of the nitrided hard layer comprises an alloy layer (surface layer) including a large amount of intermetallic compounds such as CrN and $Fe_xN_y$, and a diffused layer (inner layer) of a solid solution of N and C. Said alloy layer formed on the very surface of the nitrided hard layer suffers from severe deterioration in corrosion resistance due to considerable decrease in concentration of solid soluble Cr. On the other hand, an inner diffused layer is superior to said alloy layer in corrosion resistance but not sufficient compared with a pure austenitic stainless base of the core portion. For example, in case of forming a nitrided hard layer by nitriding, it takes 4 to 8 hours for the surface of the nitrided hard layer to generate rust in a neutral salt spray test, 500 to 700 hours for a diffused layer after removing the alloy layer from the nitrided hard layer, and over 2000 hours for a pure austenitic base per se as a core part exposed by removal of the whole nitrided layer. It means that corrosion resistance can be improved without deteriorating tapping and drilling functions which were strengthened by nitriding when the nitrided hard layer was removed from the screw head and the like exposed to outside in a tightened state.

The invention is described in detail as follows.

In this invention, out of the nitrided hard layer formed all over the surface of an austenitic stainless steel screw, the nitrided layer formed on a screw head, a neck portion and the like of the screw which are in contact with outside when tightened is removed partially. The removed parts expose austenitic stainless steel base to accomplish rust prevention with a corrosion resistance characteristic of the austenitic stainless steel per se.

The above-mentioned nitrided hard layer formed on the whole surface of the austenitic stainless steel screw comprises an alloy layer which is a surface layer and a diffused layer which is an inner layer, as mentioned above. In general, said alloy layer has a thickness of 15 to 50 µm and a surface hardness (Hv) of 750 to 1400 and the inner diffused layer has a thickness of 20 to 100 µm and a surface hardness (Hv) of 320 to 650.

In this invention, the nitrided hard layer comprising an alloy layer and a diffused layer of the screw head portion and the like is partially removed.

The way of the removal includes a chemical method such as a dipping treatment and the like in which a screw head and the like of the austenitic stainless steel screw is dipped in a mixed acid, for example, $HCl+HNO_3$ and $HF+HNO_3$, or in a single acid solution of $HNO_3$ heated to about 60° C., and a mechanical method such as scouring.

In case of removing a nitrided hard layer by said chemical method, masking is conducted before dipping in acid to the portion to be remained out of the whole nitrided layer by coating agent not denatured by acid, or only head and neck portions of the austenitic stainless steel screw are dipped in acid by making upside down. In this case, it is possible to appropriately control kinds and concentration of acid, temperature, and dipping time according to the condition of the nitrided hard layer to be removed. This method of removing the nitrided hard layer has an advantage that the portion to be removed of the nitrided hard layer is selected voluntarily.

When the nitrided hard layer is removed in this way, diameter of some portions of an austenitic stainless steel screw, such as a screw head and a neck part, where the nitrided hard layer is removed, becomes small, so that the diameter of the screw head and the neck part connected thereto are ordinarily designed to be larger in the light of the thickness of a nitrided hard layer to be removed previously. Accordingly, deterioration in strength of breaking torque due to decrease in tightening function of the screw and in diameter of the head and neck portions is prevented.

Examples of manufacturing a hard austenitic stainless steel screw according to the present invention are described in detail as follows.

In the present invention, an austenitic stainless screw is held preliminarily in a fluorine- or fluoride-containing gas atmosphere to form a fluorinated layer on the steel surface, then heated in an atmosphere of nitriding to remove said fluorinated layer and at the same time, to convert the removed surface (surface layer of the screw) into a nitrided layer. The nitrided layer of predetermined parts of the screw is removed out of the whole nitrided layer to prevent rust from generating.

The term "fluorine- or fluoride-containing gas" as used in the above-mentioned pretreatment prior to nitriding means a dilution of at least one fluorine source component selected from among $NF_3$, $BF_3$, $CF_4$, $HF$, $SF_6$, $F_2$, $CH_2F_2$, $CH_3F$, $C_2F_6$, $WF_6$, $CHF_3$, $SiF_4$ and the like contained in an inert gas such as $N_2$. Among these fluorine source components, $NF_3$ is most suitable for practical use since it is superior in reactivity, ease of handling and other aspects to the others. As mentioned previously, in the present invention, the screws are held in the above-mentioned fluorine- or fluoride-containing gas atmosphere at a temperature of, for example, 250° to 400° C. in the case of $NF_3$, for a preliminary treatment of the surface of an austenitic stainless screw and then subjected to nitriding (or carbonitriding) using a known nitriding gas such as ammonia. When $F_2$ gas alone or a mixed gas composed of $F_2$ gas and an inert gas, for example, is used as the fluorine- or fluoride-containing gas in a special case, the above-mentioned holding temperature is arranged in the range of 100° C. to 250° C. The concentration of the fluorine source component, such as $NF_3$, in such fluorine- or fluoride-containing gas should amount to, for example, 1,000–100,000 ppm, preferably 20,000–70,000 ppm, more preferably 30,000–50,000 ppm. The holding time in such a fluorine- or fluoride-containing gas atmosphere may appropriately be selected depending on the steel species, geometry and dimensions of screws, heating temperature and so forth, generally within the range of ten and odd minutes or scores of minutes.

To be more concrete in illustrating the afore-mentioned pretreatment using fluorine- or fluoride-containing gas and nitriding treatment, austenitic stainless screws X having a head portion A, a neck portion B and a thread portion C as shown in FIG. 1, for instance, are degreased and then charged into a heat treatment furnace 1 such as shown in FIG. 2. This furnace 1 is a pit furnace comprising an inner vessel 4 surrounded by a heater 3 disposed within an outer shell 2, with a gas inlet pipe 5 and an exhaust pipe 6 being inserted therein. Gas supply is made from cylinders 15 and 16 via flow meters 17, a valve 18 and the like into the gas inlet pipe 5. The inside atmosphere is stirred by means of a fan 8 driven by a motor 7. Said screws X placed in a metallic container 11 are charged into the furnace. In FIG. 2, the reference numeral 13 indicates a vacuum pump and 14 a noxious substance eliminator. A fluorine- or fluoride-containing reaction gas, for example, a mixed gas composed of $NF_3$ and $N_2$, is introduced into this furnace and heated, together with the works, at a predetermined reaction temperature. At temperature of 250°–400° C., $NF_3$ evolves fluorine in the nascent state, whereby the organic and inorganic contaminants on the surface of the screws are eliminated therefrom and at the same time this fluorine rapidly reacts with the base elements Fe and chromium on the surface and/or with oxides occurring on the steel work surface, such as $FeO$, $Fe_3O_4$ and $Cr_2O_3$. As a result, a very thin fluorinated layer containing such compounds as $FeF_2$, $FeF_3$, $CrF_2$, $CrF_4$ and the like in the metal composition is formed on the surface, for example as follows:

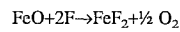
$$FeO+2F \rightarrow FeF_2+\tfrac{1}{2}O_2$$

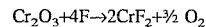
$$Cr_2O_3+4F \rightarrow 2CrF_2+\tfrac{3}{2}O_2$$

These reactions convert the oxidized layer on the surface of the screws X to a fluorinated layer. At the same time, $O_2$ adsorbed on the surface is removed therefrom. Where $O_2$, $H_2$ and $H_2O$ are absent, such fluorinated layer is stable at temperature up to 600° C. and it is considered that the stable fluorinated layer prevents oxidized layer formation on the metal bases and absorption of $O_2$ thereon until the subsequent step of nitriding. A fluorinated layer, which is similarly stable, is formed on the furnace material surface as well and minimizes damages to the furnace material surface.

The screws X thus treated with such fluorine- or fluoride-containing reaction gas are then heated at a nitriding temperature of 480° C.–700° C. Upon addition of $NH_3$ or a mixed gas composed of $NH_3$ and a carbon source gas (e.g. RX gas) in said heated condition, the fluorinated layer undergoes reduction or destruction by means of $H_2$ or a trace amount of water to give an active metal base comprised of austenitic stainless steel, as shown, for example, by the following reaction equations:

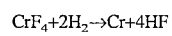
$$CrF_4+2H_2 \rightarrow Cr+4HF$$

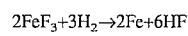
$$2FeF_3+3H_2 \rightarrow 2Fe+6HF$$

Upon formation of such active metal base, active N atoms are adsorbed thereon, then enter the metal structure and diffuse therein and, as a result, a chemical compound layer (a nitrided hard layer) containing such nitrides as $CrN$, $Fe_2N$, $Fe_3N$ and $Fe_4N$ is formed on the surface.

Thus obtained nitrided hard layer comprises an alloy layer and a diffused layer and covers all the screw x shown in FIG. 1. This invention allows to remove a nitrided hard layer on, for example, the whole head portion A and a part of the neck portion B of the screw X shown in FIG. 1, and to leave the nitrided hard layer on the thread portion C and rest of the neck portion B as they are. The removal is, for example, conducted by heating $HNO_3$—HF solution at about 50° C., dipping the whole head portion A and a part of the neck portion B of the screw therein for about 10 to 120 minutes to melt and remove the nitrided hard layer. It is efficient to remove the nitrided layer chemically, but in some cases, removal may be conducted by scouring with a scourer or the like. In the screws to which the removal treatment is conducted, the nitrided hard layer of the whole head portion and a part of the neck portion is removed in this way to expose austenitic stainless steel. Owing to this treatment, the screw X performs sufficient corrosion resistance resulted from that of austenitic stainless steel per se. The remained nitrided hard layer of a part of the neck portion B and the thread portion C significantly improves its hardness compared with that of austenitic stainless steel to give the screw the same excellent tapping and tightening functions as carburized iron articles.

The present invention has been described using a screw as an example so far, but a bolt is also included so-called screw. In the afore-mentioned description, nitriding is conducted by using $NH_3$ or a mixed gas comprising $NH_3$ and a gas containing a carbon source, but nitriding by glow discharge or by salt bath may be substituted for this nitriding.

Followings are descriptions of embodiments.

EXAMPLE 1

Figure 2:
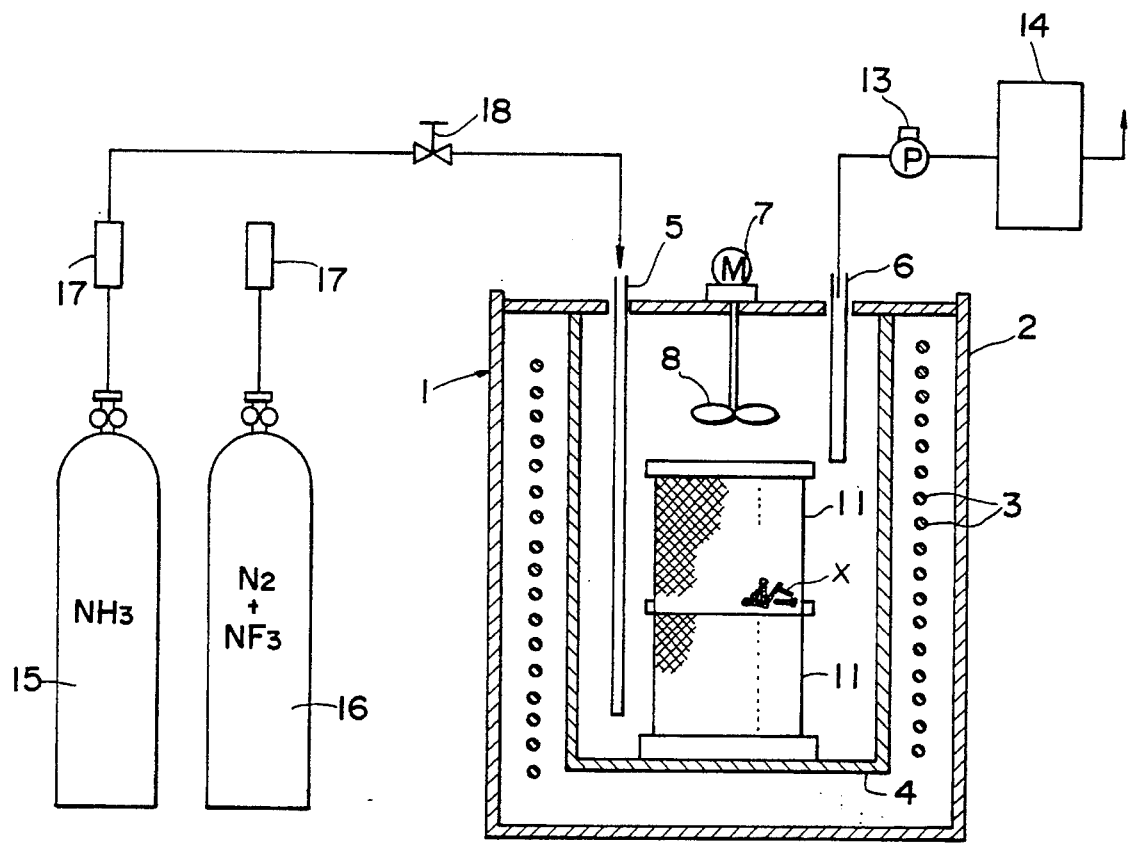
FIG. 2 shows a cross-sectional view illustrating an example of a nitriding furnace.

Cross recessed head tapping screws of SUS305, austenitic stainless steel (4.2 mm $\phi \times 19$ mm) were cleaned with trichloroethylene, then charged into a treatment furnace 1 as shown in FIG. 2, and held at 380° C. for 15 minutes in an $N_2$ gas atmosphere containing 5,000 ppm of $NF_3$ for fluoriding, then heated at 530° C., and nitriding treatment was carried out at that temperature for 3 hours while a mixed gas composed of 50% $NH_3$ plus 50% $N_2$ (hereinafter: % by volume) was introduced into the furnace. The works were then air-cooled and taken out of the furnace. Thus obtained screws had a a nitrided hard layer with thickness of 40 μm wholely. A portion of the nitrided screw except a head portion and a part of a neck portion which is a 4 mm below portion from the head out of the neck portion was coated with vinyl chloride resin liquid and dried to cover the screw with the coat. Then the screw was dipped in 10% concentration solution of $HNO_3$ at 63° C. for 15 minutes, taken out, washed with water and dried. As a result, surface hardness (Hv) of a part of the tapping screw masked with the coat (mainly a thread portion) was 1000 to 1100. On the contrary, the head part of the tapping screw removed the nitrided hard layer therefrom by the acid treatment had its surface hardness of 340 to 380. A salt spray test (Corrosion acceleration test) was conducted against the tapping screw and it was found that rust was not caused even after 2000 hours on the head part and a part of the neck portion in which the austenitic stainless steel base was exposed. On the contrary, it was found that rust was caused after 6 hours on the part (mainly the thread part) in which the nitrided hard layer was not removed. A drilling test was conducted to the above-mentioned screw and it was found that the same property as the conventional tapping screw (carburized iron steel works) was given.

EXAMPLE 2

Figure 3:
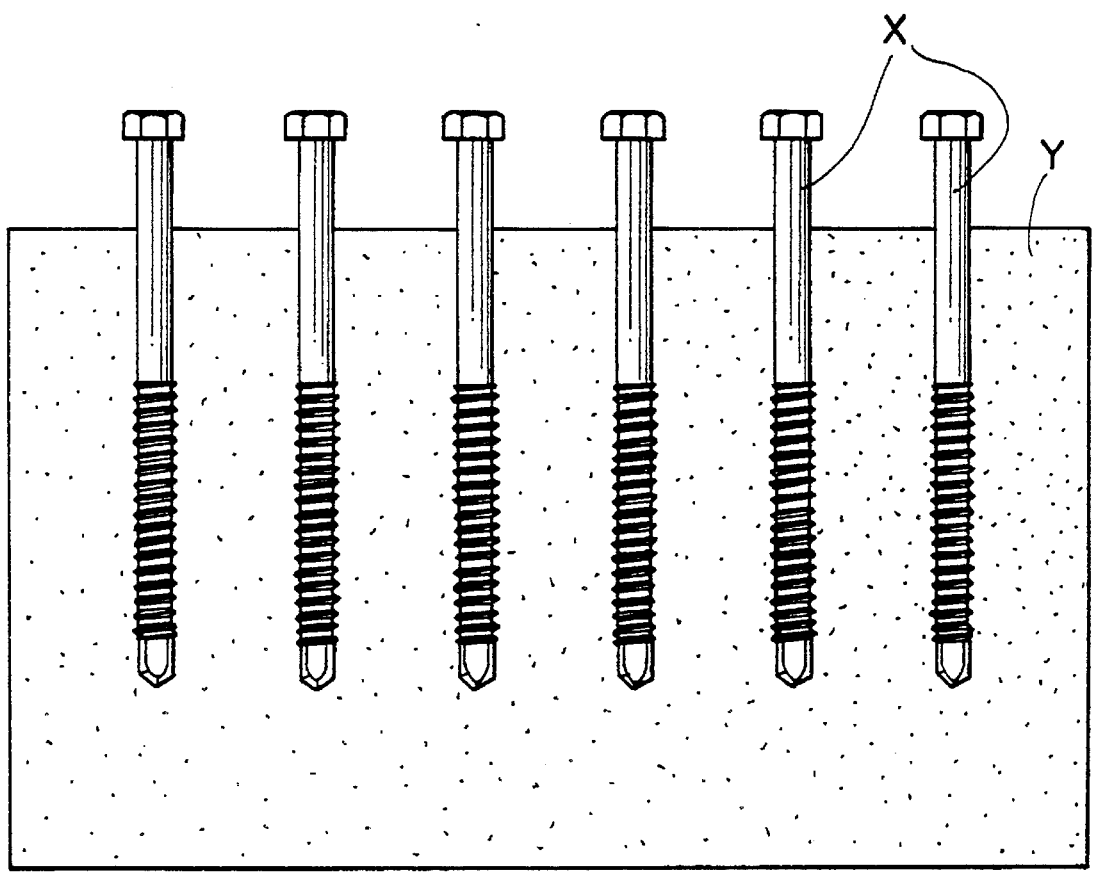
FIG. 3 shows an explanatory view illustrating an example wherein the nitrided hard layer of predetermined portions of a screw is removed.

Self-drilling screws of SUS 305, austenitic stainless steel (hexagon head, 4.8 mm $\phi \times 25$ mm) were nitrided as well as in the Example 1. In this case, the nitrided hard layer was formed on the whole self-drilling screw and its thickness was 55 μm. A portion of the nitrided screw except a head portion and a part of a neck portion which is a 5 mm below portion from the head portion out of the whole neck portion was dipped in vinyl chloride resin liquid and dried to cover the screw with a coating film. Then a plurality of the screw were screwed in a polystyrene resin plate having a thickness of 30 mm as shown in FIG. 3. The resin plate was floated upside down on strong acid solution ($HNO_3$: HCl=3:1), taken out after 5 minutes passed and furthermore floated on 10% concentration $HNO_3$ solution at 60° C. for 10 minutes as well as the above condition. Then the self-drilling screws were taken off from the polystyrene resin plate, washed with water and dried. The dried screws were plated with Zn by a conventional plating method. A drilling test of thus obtained screws was conducted against a steel plate with a thickness of 3.2 mm (SPCC). Average drilling time in this case was 3.1 seconds. The time could be shortened by 20% in average compared with a conventional self-drilling screw (carburized iron works). Result of a salt spray test thereto was the same as in the Example 1.

EXAMPLE 3

Figure 1:
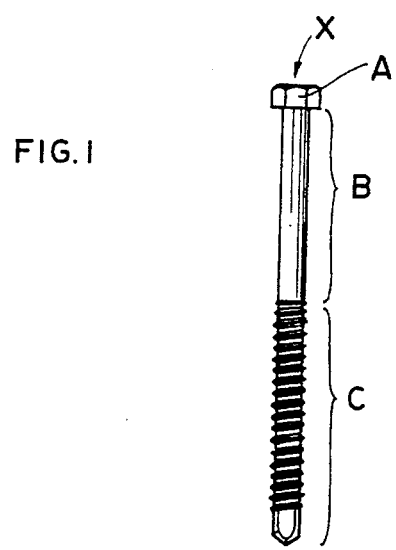
FIG. 1 shows a front view of an austenitic stainless steel self-drilling screw as an object of the invention.

Self-drilling screws of austenitic stainless steel (hexagon head, 6.3 mm $\phi \times 150$ mm) as shown in FIG. 1 were nitrided as well as in the Example 1. Thus obtained self-drilling screw was covered with a nitrided hard layer wholely and the thickness thereof is 75 μm. A part of the nitrided screw except a head portion and a part of the neck portion which is a 100 mm below portion from the head was dipped in vinyl chloride resin liquid and dried to cover the screw with coating film. Then the screw was dipped in strong acid solution ($HNO_3$: HCl=3:1) at 45° C. for 5 minutes and additionally dipped in solution with 10% concentration solution of $HNO_3$ at 60° C. for 5 minutes, taken out, washed with water and dried. A salt spray test was conducted to thus treated screw and the same result as in the Example 1 was obtained, and the result of drilling test was also the same as in the Example 2. Breaking torque value of thus obtained austenitic stainless self-drilling screw was examined. The value was lower by 7% than the austenitic stainless steel screw self-drilling screw of which the whole surface was covered by the nitrided hard layer without the acid dipping treatment. In order to avoid the deterioration of the breaking torque value, austenitic stainless steel self drilling screws of which the diameter of the screw head and the neck portion was made previously large (about 150 μm) were manufactured. They were nitrided and then dipped in acid to remove the nitrided hard layer of the screw head portion and neck portion. After eliminating the nitrided hard layer of the head and neck portions, the diameters of the head and neck portions were decreased as designed previously.

Consequently the breaking torque value was equal to an austenitic stainless steel self-drilling screw of which the whole surface layer was covered with the nitrided hard layer and the whole part has diameter as previously designed respectively.

EFFECT OF THE INVENTION

As mentioned above, in the austenitic stainless steel screw according to the present invention, a nitrided hard layer is removed from predetermined portions such as a screw head portion and a neck portion, so that austenitic stainless steel base is exposed on these portions. The head portion is exposed to outside in a tightened state and influenced by acid rain or the like, and the neck portion is in contact with rain and the like penetrating from outside. The portions where nitrided layer is removed maintains a good anti-corrosion property with that of the austenitic stainless steel itself. On the other hand, in the thread portion thereof, its hardness and the like are improved largely with the nitrided hard layer, so that surface hardness and strength thereof becomes approximately equal to those of carbon steel products to be able to tap and tighten by itself.

In the method according to the present invention, prior to nitriding the above-mentioned austenitic stainless steel screw, the screw is held in a fluorine- or fluoride-containing gas atmosphere to form a fluoride layer on the surface thereof. In that state the screw is nitrided, so that the formed nitrided layer is uniform and deep to give a hard austenitic stainless steel screw having good surface properties.

What is claimed is:

1. A stainless steel screw having a corrosion-resistant head or head and adjacent neck portion made by the process of heating an austenitic stainless steel screw in a nitriding atmosphere, whereby a nitride layer having a thickness of about 30–200 μm is formed on the surface of the screw, and removing the nitride layer from a head or a head and adjacent neck portion of the screw, thereby rendering the head or the head and adjacent neck portion corrosion-resistant.

2. A stainless steel screw having a corrosion-resistant head or head and adjacent neck portion made by the process of heating an austenitic stainless steel screw in a carbonitriding atmosphere, whereby a carbonitride layer having a thickness of about 30–200 μm is formed on the surface of the screw, and removing the carbonitride layer from a head or a head and adjacent neck portion of the screw, thereby rendering the head or the head and adjacent neck portion corrosion-resistant.

* * * * *